United States Patent
Skowaisa

(10) Patent No.: US 9,677,922 B2
(45) Date of Patent: *Jun. 13, 2017

(54) UNIVERSAL MEASUREMENT DATA ACQUISITION IN WATER

(71) Applicant: VEGA Grieshaber KG, Wolfach (DE)

(72) Inventor: Juergen Skowaisa, Schiltach (DE)

(73) Assignee: VEGA GRIESHABER KG, Wolfach (DE)

(*) Notice: Subject to any disclaimer, the term of this patent is extended or adjusted under 35 U.S.C. 154(b) by 109 days.

This patent is subject to a terminal disclaimer.

(21) Appl. No.: 14/325,063

(22) Filed: Jul. 7, 2014

(65) Prior Publication Data
US 2015/0007655 A1    Jan. 8, 2015

(30) Foreign Application Priority Data
Jul. 8, 2013 (DE) .......................... 10 2013 213 345

(51) Int. Cl.
| | |
|---|---|
| G01F 23/00 | (2006.01) |
| G01S 13/32 | (2006.01) |
| G01S 13/34 | (2006.01) |
| G01P 5/24 | (2006.01) |
| G01S 13/88 | (2006.01) |

(Continued)

(52) U.S. Cl.
CPC .......... *G01F 23/0061* (2013.01); *G01F 1/663* (2013.01); *G01F 23/284* (2013.01); *G01P 5/242* (2013.01); *G01S 13/32* (2013.01); *G01S 13/34* (2013.01); *G01S 13/583* (2013.01); *G01S 13/87* (2013.01); *G01S 13/88* (2013.01)

(58) Field of Classification Search
CPC .......... G01F 1/002; G01F 1/663; G01F 1/667; G01F 1/66; G01F 23/28; G01F 23/284; G01F 23/2845; G01P 5/242; G01S 13/583; G01S 13/584; G01S 13/87; G01S 13/88; G01S 13/32

See application file for complete search history.

(56) References Cited

U.S. PATENT DOCUMENTS 5,315,880 A * 5/1994 Bailey ..................... G01F 1/002
                                              324/642
5,420,591 A   5/1995 Annee et al.
(Continued)

FOREIGN PATENT DOCUMENTS

| | | |
|---|---|---|
| DE | 30 47 690 | 7/1982 |
| DE | 32 23 393 | 12/1983 |

(Continued)

OTHER PUBLICATIONS

English Language Machine Translation of DE 3223393, 2 pgs. obtained online at <http://worldwide.espacenet.com/> on Apr. 3, 2016.*

(Continued)

*Primary Examiner* — Lisa Caputo
*Assistant Examiner* — Punam Roy
(74) *Attorney, Agent, or Firm* — Fay Kaplun & Marcin, LLP

(57) ABSTRACT

In order to determine a level and the flow speed of a medium, FMCW transmission signals and CW transmission signals are emitted alternately. Using the Doppler effect, the flow speed of the medium can be determined from the reflected CW signal. The level is determined from the reflected FMCW signal.

12 Claims, 2 Drawing Sheets

(51) Int. Cl.
*G01F 1/66* (2006.01)
*G01F 23/284* (2006.01)
*G01S 13/58* (2006.01)
*G01S 13/87* (2006.01)

(56) References Cited

U.S. PATENT DOCUMENTS

| | | | | |
|---|---|---|---|---|
| 5,675,259 | A * | 10/1997 | Arndt | G01F 1/66 324/642 |
| 5,684,250 | A * | 11/1997 | Marsh | G01F 1/002 702/100 |
| 5,751,240 | A * | 5/1998 | Fujita | G01S 13/34 342/107 |
| 5,796,679 | A | 8/1998 | Yankielun | |
| 5,811,688 | A | 9/1998 | Marsh et al. | |
| 5,815,112 | A * | 9/1998 | Sasaki | G01S 13/87 342/113 |
| 6,184,819 | B1 * | 2/2001 | Adomat | G01S 13/48 342/107 |
| 6,317,073 | B1 * | 11/2001 | Tamatsu | G01S 7/352 342/109 |
| 6,650,280 | B2 * | 11/2003 | Arndt | G01F 23/284 342/124 |
| 7,672,797 | B2 | 3/2010 | Petroff | |
| 7,721,600 | B1 | 5/2010 | Sinclair et al. | |
| 7,729,201 | B2 * | 6/2010 | Wildey | G01F 1/66 367/101 |
| 7,861,600 | B2 | 1/2011 | Mayer et al. | |
| 8,184,039 | B2 * | 5/2012 | Garrod | G01F 1/002 342/124 |
| 8,881,603 | B2 * | 11/2014 | Ueberschlag | G01F 1/667 73/861.25 |
| 9,151,650 | B2 * | 10/2015 | Tsao | G01P 5/00 |
| 2003/0185101 | A1 | 10/2003 | Wildey | |
| 2006/0109169 | A1 * | 5/2006 | Winter | G01S 13/345 342/70 |
| 2007/0165488 | A1 * | 7/2007 | Wildey | G01F 1/66 367/101 |
| 2009/0309785 | A1 | 12/2009 | Nalezinski et al. | |
| 2010/0031753 | A1 | 2/2010 | Winfried et al. | |
| 2010/0060512 | A1 * | 3/2010 | Garrod | G01F 1/002 342/124 |
| 2010/0257930 | A1 * | 10/2010 | Isenmann | G01F 15/063 73/273 |
| 2012/0079890 | A1 * | 4/2012 | Ueberschlag | G01F 1/667 73/861.27 |
| 2012/0130509 | A1 | 5/2012 | Altendorf et al. | |
| 2013/0000416 | A1 * | 1/2013 | Croft | G01F 1/002 73/861.18 |
| 2013/0041600 | A1 | 2/2013 | Rick | |
| 2014/0340259 | A1 * | 11/2014 | Fehrenbach | G01S 13/02 342/359 |
| 2015/0007654 | A1 * | 1/2015 | Fehrenbach | G01P 5/00 73/198 |
| 2015/0007655 | A1 * | 1/2015 | Skowaisa | G01S 13/34 73/198 |
| 2015/0015431 | A1 * | 1/2015 | Trotta | G01S 7/03 342/21 |
| 2015/0153447 | A1 * | 6/2015 | Lee | G01S 13/32 342/27 |
| 2015/0323660 | A1 * | 11/2015 | Hampikian | G01S 13/58 342/109 |

FOREIGN PATENT DOCUMENTS

| | | |
|---|---|---|
| DE | 101 49 851 | 4/2003 |
| DE | 10 2008 036963 | 2/2010 |
| DE | 10 2010 044182 | 6/2012 |
| DE | 10 2012 011165 | 12/2013 |
| EP | 1431724 | 6/2006 |
| EP | 2388614 | 11/2011 |
| GB | 2376740 | 12/2002 |
| GB | 2350004 | 11/2011 |
| JP | H102779 | 1/1998 |
| JP | 3 012 522 | 2/2000 |
| JP | 2011 064677 | 3/2011 |

OTHER PUBLICATIONS

Nalezinski, "FMCW—Radarsensoren bei 24 Ghz in planarem Aufbau zur Fullstandsmessung", Dissertation Universitat der Bundeswehr Munchen, Munchen, Germany, 2003, pp. 6-8.

Ruser, "Ultraschall-Mikrowellen-Sensorsystem und Geschwindigkeits—und Abstandsmessungmit diversitar-redundanter Auswertung der Phasensignale", Oct. 2003, pp. 25-31 and 71-74.

Williams 3$^{rd}$ et al., "Technology of Water Flow Measurement Represented by Thirty Years of CMTC", IEEE, 2008, 8 sheets.

* cited by examiner

UNIVERSAL MEASUREMENT DATA ACQUISITION IN WATER

REFERENCE TO RELATED APPLICATIONS

This application claims the benefit of the filing date of German Patent Application No. 10 2013 213 345.6 filed on 8 Jul. 2013, the disclosure of which is hereby incorporated herein by reference.

FIELD OF THE INVENTION

The invention relates to measurement data acquisition in water. In particular, the invention relates to a fill level measurement device for determining a distance from a medium and a flow speed of the medium by evaluating a transmission signal emitted by the fill level measurement device and reflected by the medium, to a method, to a program element and to a computer-readable medium.

BACKGROUND

When monitoring water, such as a running water, there are various physical measurement values which are of importance. These data can be used for statistical evaluation and as a basis for planning structural measures, for flood warnings or in the field of waste water for apportioning the costs of waste water treatment.

In many cases, it is advantageous to use as compact a sensor as possible for acquiring various measurement data. At present, measurement systems are known which use the data from various sensors, which data is collected and evaluated in separate evaluation systems.

When measuring water levels, radar technology is becoming increasingly prevalent, since compared to other measurement principles, such as ultrasound, it is not influenced, or is only influenced to a small degree, by environmental influences such as temperature, wind or rain.

SUMMARY OF THE INVENTION

In accordance with a first embodiment of the invention, a free-radiating measurement device for determining a distance from a medium, from which the level of the medium can then be determined, and a flow speed of the medium by evaluating a transmission signal emitted by the measurement device and reflected by the medium is specified. The measurement device comprises a signal generator module, an antenna arrangement and a processor unit.

The signal generator module is used to generate the transmission signal, which has an amplitude modulation or a frequency modulation during a first time interval and has no such modulation during a second time interval.

For example, the transmission signal can be emitted during the first time interval in the form of a frequency-modulated continuous wave (FMCW). Alternatively, the transmission signal can be emitted during said first time interval in the form of a measurement pulse. During the second time interval, the signal can be emitted as a continuous wave (CW) signal.

In order to emit the transmission signal, an antenna arrangement is provided which can emit the signal at least in a first direction oblique to the flow direction of the medium.

The processor unit is used to determine the distance from the medium, from which the level of the medium can be calculated, and the flow speed of the medium by evaluating the transmission signal reflected by the medium and received by the antenna arrangement.

In one embodiment of the invention, the antenna arrangement is configured to emit the transmission signal in a second direction which is perpendicular to the flow direction of the medium. In other words, the transmission signal can be emitted in two different directions.

In a further embodiment of the invention, the antenna arrangement is a single antenna having two or more radiation directions, for example a patch antenna or an antenna array.

In a further embodiment of the invention, the antenna arrangement comprises a first antenna and a second antenna, the first antenna being configured to emit the transmission signal in the first direction and the second antenna being configured to emit the transmission signal in the second direction.

The two antennas can be connected to the signal generator module for example via a directional coupler, a switch or a power splitter.

It may also be provided that the antenna arrangement can be rotated with respect to a housing region of the measurement device, which region is provided for fixing the measurement device on a support, in such a way that the antenna arrangement can always be orientated optimally with respect to the flow direction of the water without the main body of the measurement device itself having to be orientated for this purpose.

In a further embodiment of the invention, the signal generator module is a high-frequency module, for example an FMCW module, which generates the frequency-modulated transmission signal in the form of an FMCW signal during the first time interval, and which generates the unmodulated transmission signal in the form of a CW signal during the second time interval.

Therefore, either an FMCW signal or a CW signal is generated alternately.

In a further embodiment of the invention, the fill level measurement device is configured to emit the transmission signal only in the first direction during the first time interval and to emit the transmission signal only in the second direction during the second time interval.

In a further embodiment of the invention, the processor unit is configured to determine the distance from the medium and the flow speed of the medium within a single measurement cycle.

It should be noted that in all the embodiments of the invention, it may be provided that the transmission signal is generated by the same signal generator module irrespective of whether it is emitted perpendicular to the flow direction of the medium and/or obliquely to the flow direction of the medium. In particular, it may also be provided that the received, reflected transmission signals are evaluated by the same processor unit. The distance can be determined from the transmission signal emitted in the first direction after it has been reflected on the surface of the filling medium and the flow speed of the medium can be determined from the transmission signal emitted in the second direction.

The flow speed and the distance of the fill level measurement device from the medium can be determined by a single measurement in which the transmission signal is emitted in the first direction perpendicular to the flow direction of the medium and, before this, after this or simultaneously, is emitted in the second direction obliquely to the flow direction of the medium.

The transmission signal is accordingly initially emitted in two different directions, followed by an evaluation of the corresponding signals reflected on the surface of the filling medium, which signals make it possible to determine the flow speed and the distance (i.e. the fill level or level).

In addition to the simultaneous emission of the transmission signal in the two different directions, it is also possible to initially emit the transmission signal in the first direction and subsequently in the second direction (or vice versa).

Distance and flow speed can be determined sequentially or in parallel, depending on the embodiment of the fill level measurement device.

It may also be provided that the measurement cycle is defined as follows. The distance is measured repeatedly by transmission signals which are in succession over time being emitted in the first direction and the correspondingly reflected signals being evaluated. The transmission signal emitted obliquely to the flow direction of the medium is, however, evaluated less often, for example only after each tenth or twentieth measurement of the distance. This may mean that the transmission signal is also only emitted in the second direction if a certain number of distance measurements has taken place or if a certain amount of time has elapsed since the last determination of flow speed (for example one minute).

It is, however, also possible for the transmission signal to be emitted more often in the second direction, and for the corresponding reflected signal, which is received from this direction by the antenna arrangement, to however only also be evaluated (to determine the flow speed) if a certain number of fill level measurements has taken place or if a certain amount of time has elapsed since the last determination of flow speed (for example one or two minutes).

It may accordingly be provided that the determination of the flow speed is triggered by a certain event. In this context, as already described, said event may be a certain number of distance measurements being carried out and/or a certain amount of time elapsing since the last determination of flow speed. Alternatively or additionally, the event triggering the determination of flow speed may also be constituted by the level (that is to say the "distance") having changed by more than a predetermined threshold value over a predetermined period of time. In other words, in this embodiment, a measurement of flow speed is triggered if the distance changes sufficiently rapidly.

In a further embodiment of the invention, the fill level measurement device is configured as a fill level radar. In particular, the measurement device may be configured for connection to a 4-20 mA two-wire line, via which it is supplied with power and can simultaneously transmit a measurement value which is proportional to the flowing current, Communication can also take place via the two-wire line.

A further aspect of the invention provides a method for determining a distance from a medium and a flow speed of the medium by evaluating a transmission signal emitted from a measurement device and reflected by the medium. Initially, a transmission signal is generated which has an amplitude modulation or a frequency modulation during a first time interval and which has no modulation during a second time interval. Subsequently, the transmission signal is emitted in a first direction oblique to the flow direction of the medium. It may further be provided that the transmission signal is emitted in a second direction which is substantially perpendicular to the flow direction of the medium. The distance from the medium and the flow speed of the medium are subsequently determined by evaluating the transmission signal reflected by the medium and received by the antenna arrangement.

It is therefore possible to determine the distance (by frequency modulation of the transmission signal) and the speed of the water by evaluating the Doppler effect.

A further aspect of the invention provides a program element which, when executed on a processor unit of a measurement device, causes the measurement device to carry out the steps described above and below.

A further aspect of the invention specifies a computer-readable medium, on which a program element is stored, which, when executed on a processor of a measurement device, causes the measurement device to carry out the steps described above and below.

In the following, embodiments of the invention are described with reference to the drawings, in which like reference numerals denote like or similar elements. However, like or similar elements may also be denoted by different reference numerals.

DETAILED DESCRIPTION OF EMBODIMENTS

The figures of the drawings are schematic and not to scale.

Figure 1:
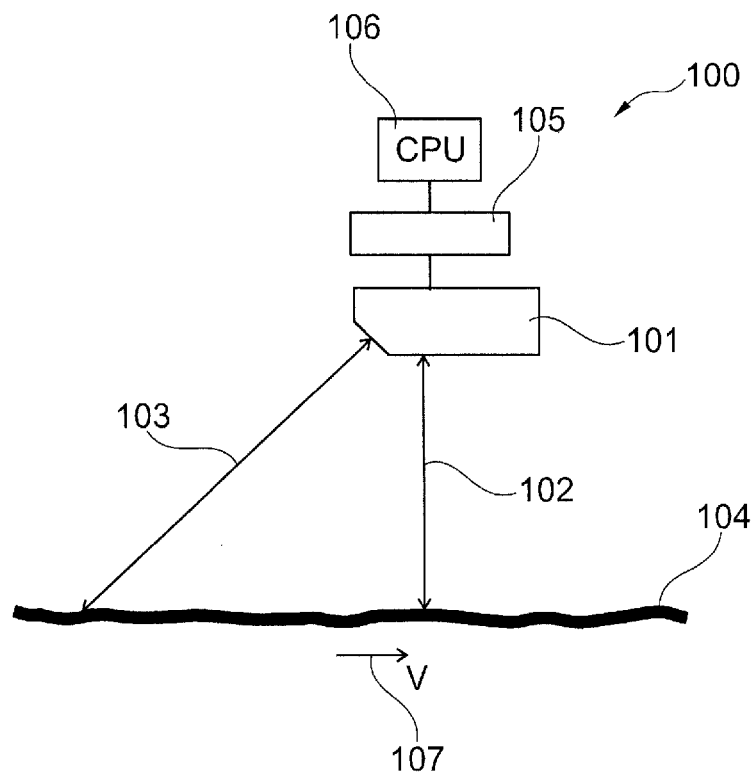
FIG. 1 shows a measurement device in accordance with an embodiment of the invention.

FIG. 1 shows a measurement device 100 in accordance with an embodiment of the invention. The measurement device is a distance measurement device, for example in the form of a fill level radar.

The measurement of the flow speed of the medium, which is a fluid, and of the distance from the sensor 100 are combined in a single measurement system, for example an FMCW radar system. The measurement device comprises either two antennas or a single antenna. The measurement device 100 in FIG. 1 is configured to emit a first transmission signal in a direction 103 which is oblique to the flow direction 107 of the medium 104. Further, the antenna arrangement of the measurement device 100 is configured to emit another part of the transmission signal in direction 102 which is perpendicular to the flow direction 107 of the medium 104.

The transmission signal is then reflected at least in part on the surface of the medium. Since the surface of the medium can have a slight rippling or wave formation, the flow speed of the medium can be determined from the transmission signal which is emitted obliquely, reflected on the surface of the medium and received by the antenna arrangement 101, taking into account the Doppler effect. After being reflected by the surface of the medium and being received by the antenna arrangement 101, the transmission signal emitted in the direction 102 can be used for measuring distances.

If two separate antennas are used in the antenna arrangement 101, the distance and the flow speed of the medium can be measured alternately by means of a switch.

In addition, the antenna arrangement 101 can be a single antenna which has a plurality of primary radiation directions 102, 103.

This results in a simple installation for measuring the distance from a surface of the medium and for simultaneously (or subsequently) measuring the flow speed and optionally also the flow direction of the medium. The flow throughput can also be determined using a measurement device of this type if the geometry of the flow bed of the liquid is known.

The measurement device 100 comprises a processor unit 106, which is connected to the HF module 105 (transmission signal generator unit). The HF module is connected to the antenna arrangement 101 via a signal line. The antenna arrangement 101 may be located on a housing and it may be provided that the antenna arrangement can be rotated counter to the HF module.

The antenna arrangement 101 therefore emits a transmission signal, a relatively large portion of the transmission signal being directed in the direction 103 oblique to the flow speed 107 of the fluid 104. At least part of this obliquely emitted signal portion is reflected by the surface of the flowing fluid and returned to the antenna arrangement in the direction 103. The antenna arrangement subsequently receives this reflected signal portion of the transmission signal.

After this measurement (or before it) a second, potentially smaller signal portion is emitted perpendicular to the flow speed 107 of the fluid 104 in direction 102, reflected on the surface of the fluid and radiated back to the antenna in the opposite direction. The antenna subsequently receives this signal portion of the reflected transmission signal.

Subsequently, from the received, reflected transmission signal portions, an echo curve is generated from which the distance from the surface of the fluid is calculated and the flow speed is determined (by a Doppler evaluation of the signal portion emitted obliquely with respect to the flow direction).

When using an FMCW radar method for measuring distances, it is possible to also generate a CW signal with the same microwave system 105 in order to detect the speed for example of the flowing water.

When measuring the distance, a difference frequency between the transmitted and received signals is determined by means of a frequency-modulated continuous wave signal (FMCW signal). The difference frequency is proportional to the distance from the surface of the water. By means of a detailed evaluation of the reflection signals using an FFT analysis (FFT: fast Fourier transform), various reflections can be determined.

The speed of an object can be determined by means of a continuous wave signal (CW signal). In this case, a microwave signal impinges on a moving object. The movement results in a Doppler shift of the reflected signal by comparison with the transmission signal. The difference frequency is directly proportional to the speed. In this case, it is particularly interesting that the same electronics system can be used for the distance measurement and the speed measurement, no modulation of the transmission signal being necessary during the speed measurement.

In a vertical arrangement, a second, slightly obliquely arranged antenna system for speed measurement is practical (cf. FIG. 1).

Figure 2:
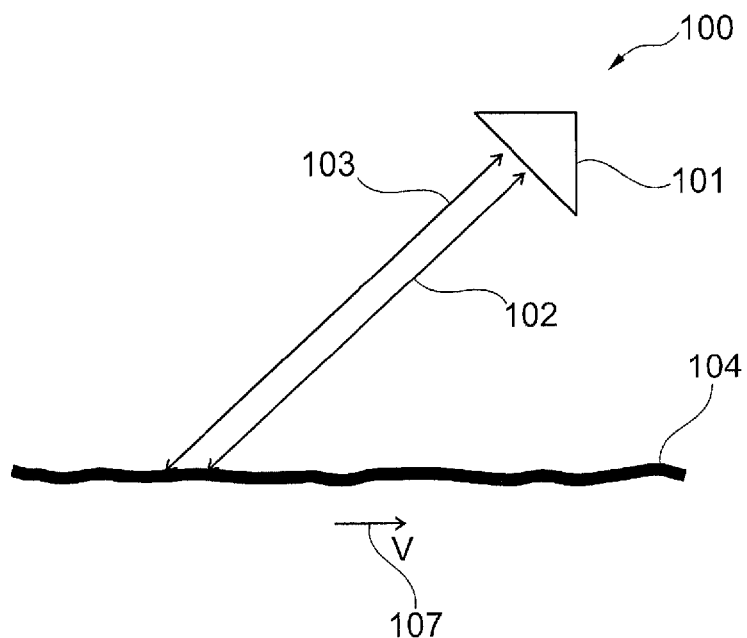
FIG. 2 shows a measurement device in accordance with a further embodiment of the invention.

If the sensor is arranged obliquely for the measurement (see FIG. 2), only one antenna system, which emits in a single direction, is required in order to detect the distance and the speed. In any case, inaccuracies can occur in the distance measurement. In this case, both the FMCW signal and the CW signal are emitted in the same direction oblique to the flow direction 107 of the water.

Integration of additional sensors: in some uses, additional measurement values are required.

Therefore, for example, the ambient temperature may be of interest. A temperature sensor can be integrated in the measurement device. In some embodiments of the invention, the connection of additional sensors is also provided in order to detect wind speed, ozone levels or the like.

Storing the measurement values and data transfer: so that a separate data storage device is not necessary, a corresponding storage device can be integrated in the measurement device. The collected data can be transferred to a central station at cyclical intervals by means of a GSM module or by means of existing digital data transfer systems.

Fields of application of the invention are measuring river levels, also in the event of backwater, measuring the flow throughput in channel networks for waste water, cooling water, etc., and measuring the tide on coasts and offshore using flow information.

In particular, it can be provided that a single electronics system is used both for the microwave technology and for the additional signal processing for measuring the level and the flow speed of the water.

Figure 3:
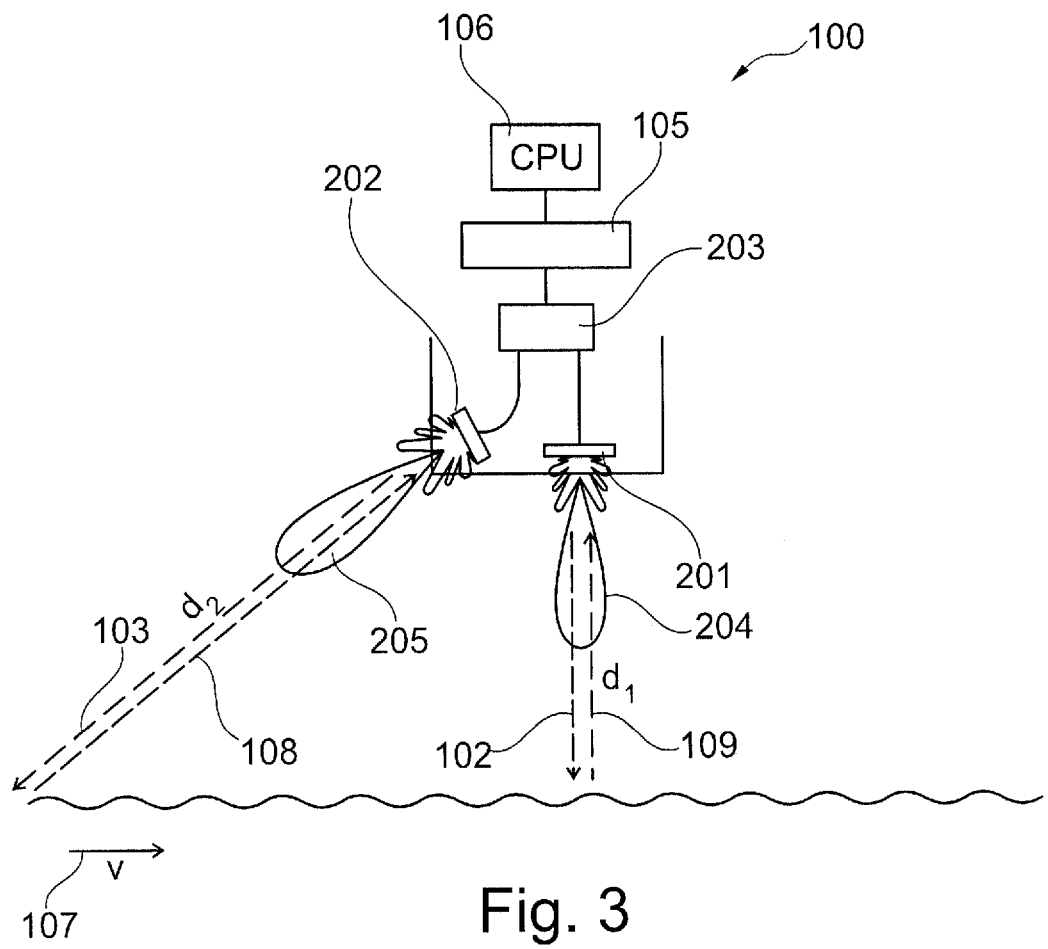
FIG. 3 shows a measurement device in accordance with a further embodiment of the invention.

FIG. 3 shows a measurement device 100 in accordance with a further embodiment of the invention. By contrast with the embodiment of FIG. 2, two antennas 201, 202 are provided, and are each connected via their own signal line to a directional coupler, a power splitter or a switch 203 which connects the two antennas to the HF module 105.

An FMCW module for both measurements (distance and flow speed) is thus provided, and is coupled to one antenna for the distance measurement and another antenna for the flow speed via a switch, a power splitter or a directional coupler. One of the two antennas in each case can be selected for measurement using the switch.

In this way, alternating measurements of distance and flow speed are possible. Switching between the two measurement methods takes place on the HF signal path between the antenna and the HF module 105.

The HF module may also, as described above, be connected to the two antennas via a directional coupler or power splitter 203, as is shown schematically in FIG. 3. In this case, an optimised antenna is used for each of the two measurements. The antenna 201 emits the transmission signal perpendicular to the flow direction 107, and this is represented by the transmission lobe 204. The second antenna 202, which is arranged obliquely with respect to the first antenna 201, emits the transmission signal in the oblique direction 103, and this is represented by the transmission lobe 205.

By using two separate antennas, larger amplitudes of the two received signals can be achieved. The evaluation takes place as in the other embodiments.

Figure 4:
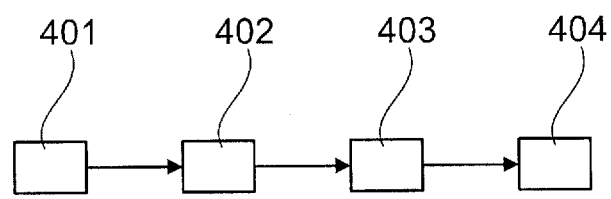
FIG. 4 is a flow chart of a method in accordance with an embodiment of the invention.

FIG. 4 is a flow chart of a method in accordance with an embodiment of the invention.

In step 402, a signal generator module generates a transmission signal which is emitted obliquely to the flow direction of water in step 402, more particularly in the form of a CW signal. In step 403, the transmission signal is subsequently emitted perpendicular to the flow direction of the water, more particularly in the form of a frequency-modulated signal (FMCW). In step 404, the reflected signals received by the antenna arrangement are evaluated, and the flow speed and the level of the medium are calculated therefrom.

For the sake of completeness, it should be noted that "comprising" and "having" do not exclude the possibility of other elements or steps, and "an" or "a" does not exclude the possibility of a plurality. It should further be noted that features or steps which have been described with reference to one of the above embodiments may also be used in

The invention claimed is:

1. A fill level measurement device for determining a distance from a medium and a flow speed of the medium by evaluating a transmission signal emitted by the fill level measurement device and reflected by the medium, comprising:
   a signal generator module generating the transmission signal, which has an amplitude modulation or a frequency modulation during a first time interval and which has no modulation during a second time interval;
   an antenna arrangement emitting the transmission signal in a first direction oblique to the flow direction of the medium; and
   a processor unit determining the distance from the medium and the flow speed of the medium by evaluating the transmission signal reflected by the medium and received by the antenna arrangement,
   wherein the antenna arrangement is configured to emit the transmission signal in a second direction which is perpendicular to the flow direction of the medium.

2. The fill level measuring device according to claim 1, wherein the antenna arrangement is a single antenna having two or more radiation directions.

3. The fill level measuring device according to claim 1, wherein the antenna arrangement comprises a first antenna and a second antenna, wherein the first antenna is configured to emit the transmission signal in the first direction and the second antenna is configured to emit the transmission signal in the second direction.

4. The fill level measurement device according to claim 3, wherein the two antennas are both connected to the signal generator module via a directional coupler, a switch or a power splitter.

5. The fill level measurement device according to claim 1, wherein the antenna arrangement comprises a planar antenna array.

6. The fill level measurement device according to claim 1, wherein the signal generator module is an FMCW module, which generates the frequency-modulated transmission signal in the form of an FMCW signal during the first time interval, and which generates the unmodulated transmission signal in the form of a CW signal during the second time interval.

7. The fill level measurement device according to claim 6, wherein the fill level measurement device is configured to transmit the transmission signal only in the first direction during the first time interval and to transmit the transmission signal only in the second direction during the second time interval.

8. The fill level measurement device according to claim 1, wherein the processor unit is configured to determine the distance from the medium and the flow speed of the medium within a single measurement cycle.

9. The fill level measurement device according to claim 1, wherein the fill level measuring device is a fill level radar.

10. The fill level measurement device according to claim 1, wherein the fill level measuring device is a 2-wire line sensor.

11. A method for determining a distance from a medium and a flow speed of the medium by evaluating a transmission signal emitted by a measurement device and reflected by the medium, comprising:
   generating a transmission signal which has an amplitude modulation or a frequency modulation during a first time interval and which has no modulation during a second time interval;
   emitting the transmission signal in a first direction oblique to the flow direction of the medium; and
   determining the distance from the medium and the flow speed of the medium by evaluating the transmission signal reflected by the medium and received by the antenna arrangement,
   wherein the antenna arrangement is configured to emit the transmission signal in a second direction which is perpendicular to the flow direction of the medium.

12. A non-transitory computer-readable medium on which a program element is stored which, when executed on a processor unit of a fill level measurement device, causes the fill level measurement device to carry out the steps according to claim 11.

* * * * *